(12) United States Patent
Imafuku

(10) Patent No.: US 8,159,729 B2
(45) Date of Patent: Apr. 17, 2012

(54) IMAGE READING APPARATUS AND IMAGE READING METHOD

(75) Inventor: Kazuya Imafuku, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 12/049,211

(22) Filed: Mar. 14, 2008

(65) Prior Publication Data

US 2008/0225353 A1    Sep. 18, 2008

(30) Foreign Application Priority Data

Mar. 14, 2007   (JP) .................................. 2007-065774

(51) Int. Cl.
   *H04N 1/04* (2006.01)
(52) U.S. Cl. ........ 358/488; 358/474; 358/501; 382/286; 399/376
(58) Field of Classification Search .................. 358/488, 358/474, 449, 1.13, 1.2, 501, 540, 38, 528, 358/505; 382/286, 299, 203; 399/376, 362
See application file for complete search history.

(56) References Cited

U.S. PATENT DOCUMENTS

| | | | | |
|---|---|---|---|---|
| 5,625,720 A * | 4/1997 | Miyaza et al. | ................ | 382/284 |
| 5,749,040 A * | 5/1998 | Muramatsu | .................... | 399/406 |
| 6,148,118 A * | 11/2000 | Murakami et al. | ............ | 382/284 |
| 6,438,274 B1 * | 8/2002 | Tokuyama et al. | ........... | 382/298 |
| 6,665,431 B2 * | 12/2003 | Jones et al. | .................... | 382/135 |
| 6,687,420 B1 * | 2/2004 | Matsuda et al. | ............... | 382/286 |
| 6,782,139 B2 * | 8/2004 | Bender et al. | ................. | 382/278 |
| 6,975,434 B1 * | 12/2005 | Pilu et al. | ....................... | 358/474 |
| 7,580,647 B2 * | 8/2009 | Komiya | .......................... | 399/49 |
| 2003/0009420 A1 * | 1/2003 | Jones | ............................... | 705/39 |
| 2003/0219171 A1 * | 11/2003 | Bender et al. | ................. | 382/278 |
| 2004/0169895 A1 * | 9/2004 | Hashizume et al. | .......... | 358/474 |
| 2007/0264064 A1 * | 11/2007 | Hashizume et al. | .......... | 399/376 |

FOREIGN PATENT DOCUMENTS

| | | |
|---|---|---|
| JP | 11-155060 A | 6/1999 |
| JP | 11-225264 A | 8/1999 |
| JP | 2004-032571 A | 1/2004 |

* cited by examiner

*Primary Examiner* — Negussie Worku

(74) *Attorney, Agent, or Firm* — Canon USA, Inc., I.P. Division

(57) ABSTRACT

An image reading apparatus includes a first image generation unit configured to scan a document set with one edge aligned with a reference position of a document positioning plate to generate a first image, a second image generation unit configured to scan the document set with a second edge, side opposite to the first edge, aligned with the reference position of the document positioning plate to generate a second image, a detection unit configured to perform matching processing to match image data of the first image with image data of the second image to detect an offset between the first image and the second image, and a determination unit configured to determine a size of the document based on the offset detected by the detection unit. The second edge may be opposite the first. Alternatively, corners may be used instead of edges.

6 Claims, 16 Drawing Sheets

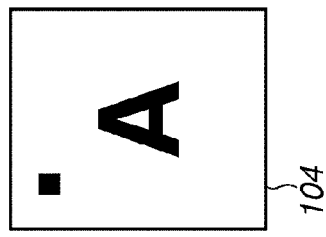
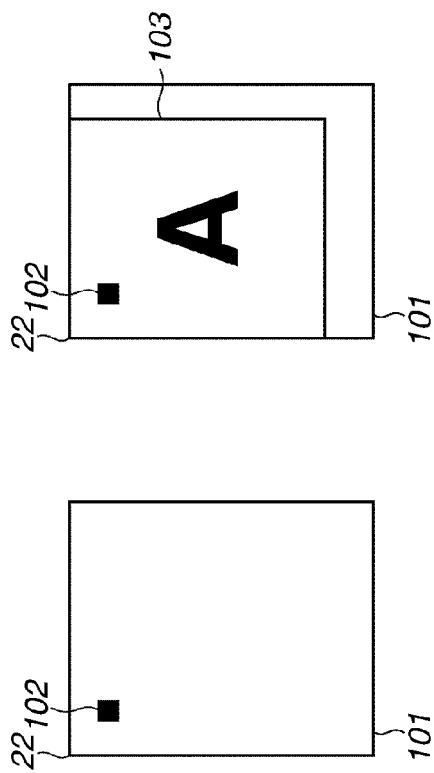
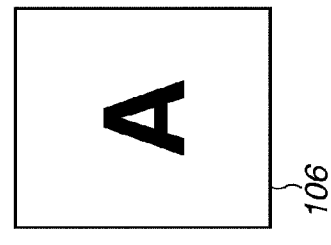
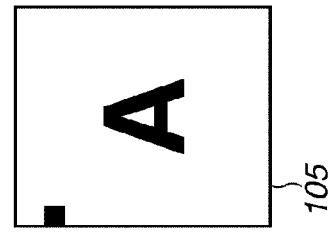
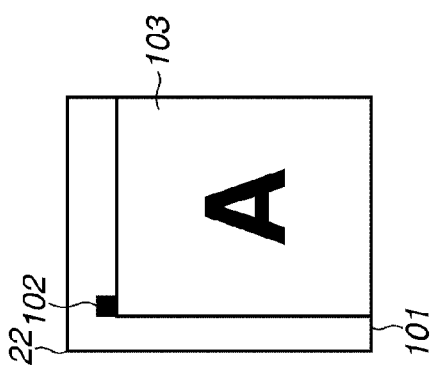
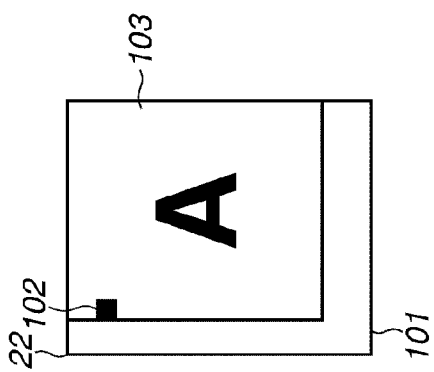

IMAGE READING APPARATUS AND IMAGE READING METHOD

BACKGROUND OF THE INVENTION

1. Field of the Invention

The present invention relates to a technique of detecting a document size with high accuracy.

2. Description of the Related Art

Image reading apparatuses have been used in a wide variety of applications, such as facsimile machines and copying machines, as well as single-function computer peripherals like image scanners. Further, recently, image reading apparatuses have been widely used in multifunction peripherals. A multifunction peripheral (MFP) provides multiple functions, such as an image reading function, a copying function, and a facsimile function.

In an image reading apparatus, it is necessary to detect an area of a document placed on a document positioning plate with high accuracy in order to obtain high-quality digital image data. As a known technique for detecting a position and size of a document with high accuracy, a dedicated sensor having a size detection capability corresponding to a document size (e.g., an optical sensor or a sensor for detecting a position of an original guide that is manually adjusted) is attached to the image reading apparatus. However, if a dedicated sensor is used in the image reading apparatus, it is difficult to improve its productivity, achieve miniaturization, and reduce manufacturing costs. To overcome these problems, it is proposed to perform analysis on an image prescanned with an optical sensor used for general image reading operations and then detect a document size.

For example, a technique discussed in Japanese Patent Application Laid-Open No. 11-155060 analyzes image density of image data obtained by scanning a document to determine a threshold value for defining a document edge (document edge) According to the technique, the image data is analyzed again to set the document edge to where the image density exceeds the threshold value at a certain rate. Further, according to the technique discussed in Japanese Patent Application Laid-Open No. 11-225264, when the document edge cannot be detected with the above-described method, the last detected point on the document is determined as the document edge. Moreover, the technique discussed in Japanese Patent Application Laid-Open No. 2004-032571 determines any particular information of prescanned image data as reference data and compares other data with the reference data to define a document edge. With this processing, a document size can be determined without checking the entire prescanned image data.

Further, the above document size detecting techniques involve some problems. The problems are described with reference to FIGS. 16A to 16F. FIG. 16A illustrates how a document 41 is put on a document positioning plate 25 in alignment with a document stop position 22. If the entire surface of the document positioning plate 25 is scanned in this state, a shadow 43 is cast on the edge of a pre-scanning image by a gap between a pressure plate and the document positioning plate as illustrated in FIG. 16B as discussed in Japanese Patent Application Laid-Open No. 2004-032571. If the detected document is analyzed without any correction, there arises a problem of erroneously detecting the entire document positioning plate surface as a document area. To overcome this problem, as illustrated in FIG. 16C, the document is detected, excluding an area 44 having a width of several mm from the edge of the pre-scanning image. In short, only an image 45 is analyzed as illustrated in FIG. 16D. The width of the area 44 omitted from the pre-scanning image is determined in advance. The width is designed preparing for the worst case in consideration of mechanical accuracy of a copying machine main body and individual differences. Thus, its value is a non-negligible one. Hence, if the document overlaps the edge of the document positioning plate, the area 45 as illustrated in FIG. 16D becomes an analysis-target area, which hinders appropriate detection. As a result, document data is not partially detected. To avoid such a situation, the technique discussed in Japanese Patent Application Laid-Open No. 2004-032571 does not cut off the left edge and upper edge of a pre-scanning image on the assumption that a document abuts against a document stop position 22. In other words, the size of an analysis-target area is increased up to an analysis-target area 46 as illustrated in FIG. 16E (in the following description, an analysis-target area has the increased size of the corrected analysis-target area 46). However, if the lower right side of a document overlaps the area 44 of FIG. 16C, a lower right area of the document is not detected as illustrated in FIG. 16F.

If a size of a document positioning plate is increased enough to prevent the document from overlapping an edge portion of the document positioning plate, with a view to solving this problem, main body size and cost increase. Further, if a shadow tends to appear due to a large gap between the pressure plate and the document positioning plate, even though a document is put within the analysis-target area, the document might be erroneously detected.

SUMMARY OF THE INVENTION

The present invention is directed to image recording apparatuses capable of detecting a document size with high accuracy.

According to an aspect of the present invention, an image reading apparatus that scans a document set on a document positioning plate, includes: a first image generation unit configured to scan a document set with a first edge aligned with a reference position of the document positioning plate to generate a first image; a second image generation unit configured to scan the document set with a second edge, opposite to the first edge, aligned with the reference position of the document positioning plate to generate a second image; a detection unit configured to perform matching processing to match image data of the first image with image data of the second image to detect an offset between the first image and the second image; and a determination unit configured to determine a size of the document based on the offset detected by the detection unit.

According to another aspect of the present invention, an image reading apparatus that scans a document set on a document positioning plate, includes: a first image generation unit configured to scan a document set with a first corner aligned with a reference position of the document positioning plate to generate a first image; a second image generation unit configured to scan the document set with a second corner, diagonal to the first corner, aligned with the reference position of the document positioning plate to generate a second image; a detection unit configured to perform matching processing to match image data of the first image with image data of the second image to detect an offset between the first image and the second image; and a determination unit configured to determine a size of the document based on the offset detected by the detection unit.

According to another aspect of the present invention, an image reading apparatus that scans a document set on a document positioning plate, includes: a first image generation unit configured to scan a document set with a first edge aligned with a reference position of the document positioning plate to generate a first image; a notification unit configured to send a notification to prompt the user to set the document with a second edge, opposite to the first edge, aligned with the reference position of the document positioning plate after the first image generation unit scans the document; an input unit configured to receive an instruction input by a user; a second image generation unit configured to scan the document to generate a second image in response to the instruction input by the user; a detection unit configured to perform matching processing to match image data of the first image with image data of the second image to detect an offset between the first image and the second image; and a determination unit configured to determine a size of the document based on the offset detected with the detection unit.

According to another aspect of the present invention, a method for controlling an image reading apparatus including a reading unit that scans a document set on a document positioning plate, includes: scanning a document set with a first edge being aligned with a reference position of the document positioning plate to generate a first image with the reading unit; scanning the document set with a second side, opposite to the first edge, being aligned with a reference position of the document positioning plate to generate a second image with the reading unit; matching image data of the first image with image data of the second image to detect an offset between the first image and the second image; and determining a size of the document based on the detected offset. A storage medium storing a program that causes a computer (or other machine) to execute the method is another aspect of the present invention.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 13A to 13G illustrate an example of scanning of a document on a dusty, stained, and scratched document positioning plate.

DETAILED DESCRIPTION OF THE EMBODIMENTS

Various exemplary embodiments, features, and aspects of the invention are described in detail below with reference to the drawings.

First Exemplary Embodiment

Figure 1:
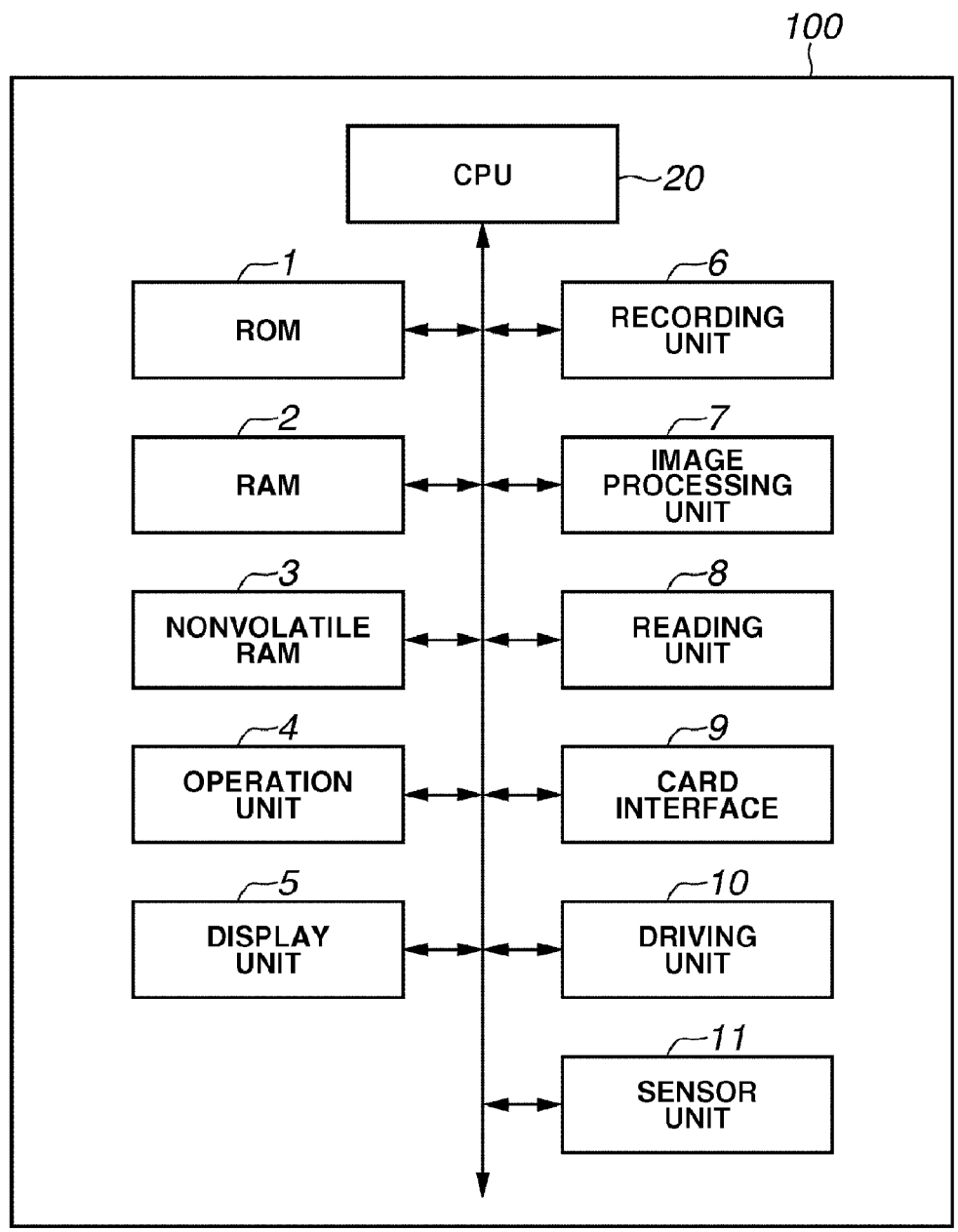
FIG. 1 is a block diagram illustrating the configuration of an MFP according to a first exemplary embodiment of the present invention.
Figure 2A:
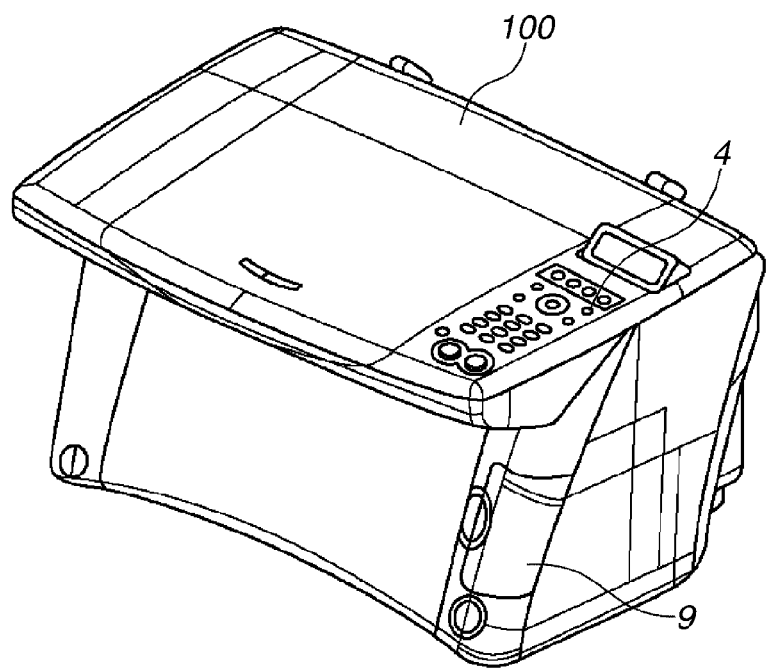
FIGS. 2A and 2B are external perspective views of the MFP.
Figure 2B:
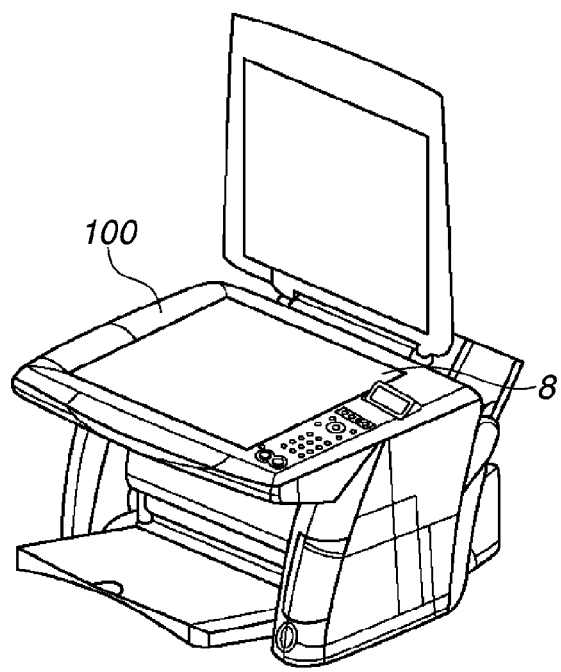

FIG. 1 is a block diagram illustrating the configuration of an MFP 100 according to a first exemplary embodiment of the present invention. FIGS. 2A and 2B are external perspective views of the MFP 100.

The MFP 100 includes a central processing unit (CPU) 20 for executing various types of control, a ROM 1, a random access memory (RAM) 2, and a nonvolatile RAM 3. Further, the MFP 100 includes an operation unit 4, a display unit 5, a recording unit 6, an image processing unit 7, a reading unit 8, a card interface 9, a driving unit 10, and a sensor unit 11, which actually perform various functions.

The ROM 1 stores a control command program and the like of the MFP 100. The CPU 20 executes a program stored in the ROM 1, according to a predetermined operation of the operation unit 4 to control various functions of the MFP 100.

The reading unit 8 includes an image sensor 24 and reads a document image and outputs analog luminance data in red (R), green (G), and blue (B). Examples of image sensors include a charge coupled device (CCD) and a contact image sensor (CIS).

Figure 3:
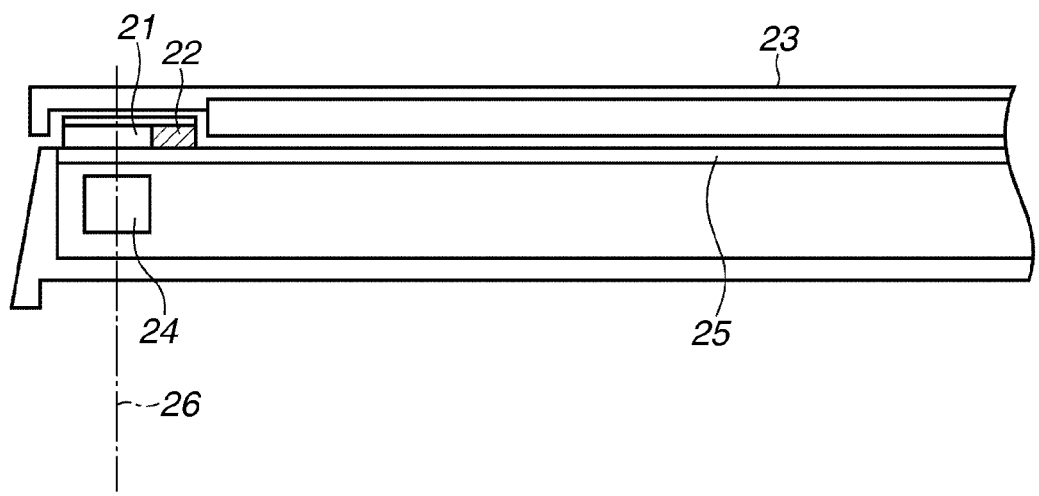
FIG. 3 illustrates a detailed configuration of a reading unit.

FIG. 3 illustrates a detailed configuration of the reading unit 8. In FIG. 3, a black/white reference plate 21 is a reference plate for generating shading data with image sensor 24. The plate includes two color portions, more particularly a white portion and a black portion. The light of the image sensor 24 is turned on/off under the black/white reference plate 21 to obtain shading data of each color.

A document stop position 22 is a reference position for setting a document in a proper position of the document positioning plate 25. A user sets a document with the upper end of a document aligned with the reference position. A pressing plate 23 is a cover for shielding external light at the time of scanning a document. A while sheet is used in an inside.

The document positioning plate 25 is made of transparent glass. The image sensor 24, which is driven by the driving unit 10 as described later, moves below the document positioning plate 25 and scans a document. If the apparatus is on standby, the image sensor 24 stays in an image sensor home position 26. The card interface 9 reads an image file captured, for example, with a digital still camera and recorded on a memory card or other portable storage medium according to a predetermined operation of the operation unit 4.

The image processing unit 7 performs image processing such as image analysis, thumbnail generation, thumbnail correction, or output image correction. Print data obtained through these image processing is stored in the RAM 2. If an amount of the print data stored in the RAM 2 reaches a predetermined amount sufficient for recording in the recording unit 6, the recording unit 6 executes a recording operation.

In such image processing, different types of print data are generated according to printing settings such as a recording sheet size or type, whether to zoom an image, or whether to print an image with or without a frame.

The nonvolatile RAM 3 is, for example, a battery-backup static random access memory (SRAM) which stores data unique to the MFP 100. The operation unit 4 includes various keys. The keys include, for example, a power key for software turning on/off, a photo direct printing start key for selecting image data stored in a storage medium to start recording, and a monochrome or color copying start key for starting monochrome or color copying.

Moreover, there are a mode key for designating copy resolution or image quality, a cancel key for canceling a copying (or other) operation, a numerical keypad for entering the number of copies, and an enter key. The CPU 20 determines whether each key is pressed and controls each unit based on the determination result.

The display unit 5 includes a dot-matrix type liquid crystal display unit (LCD) and an LCD driver. The display unit 5 displays various types of information under the control of the CPU 20. The recording unit 6 includes an inkjet head and a general-purpose integrated circuit (IC). The unit 6 reads recording data stored in the RAM 2 and prints out the data in hardcopy under the control of the CPU 20.

The driving unit 10 includes a stepping motor for driving a sheet discharge roller, a gear for transmitting a driving force of the stepping motor, and a driver circuit for controlling the stepping motor, which are driven during the operations of the reading unit 8 and the recording unit 6.

The sensor unit 11 includes a recording sheet width sensor, a recording sheet presence sensor, a document width sensor, a document sensor, and a recording medium detection sensor. The CPU 20 detects conditions of a document and a recording sheet based on information input from the sensors.

Figure 4:
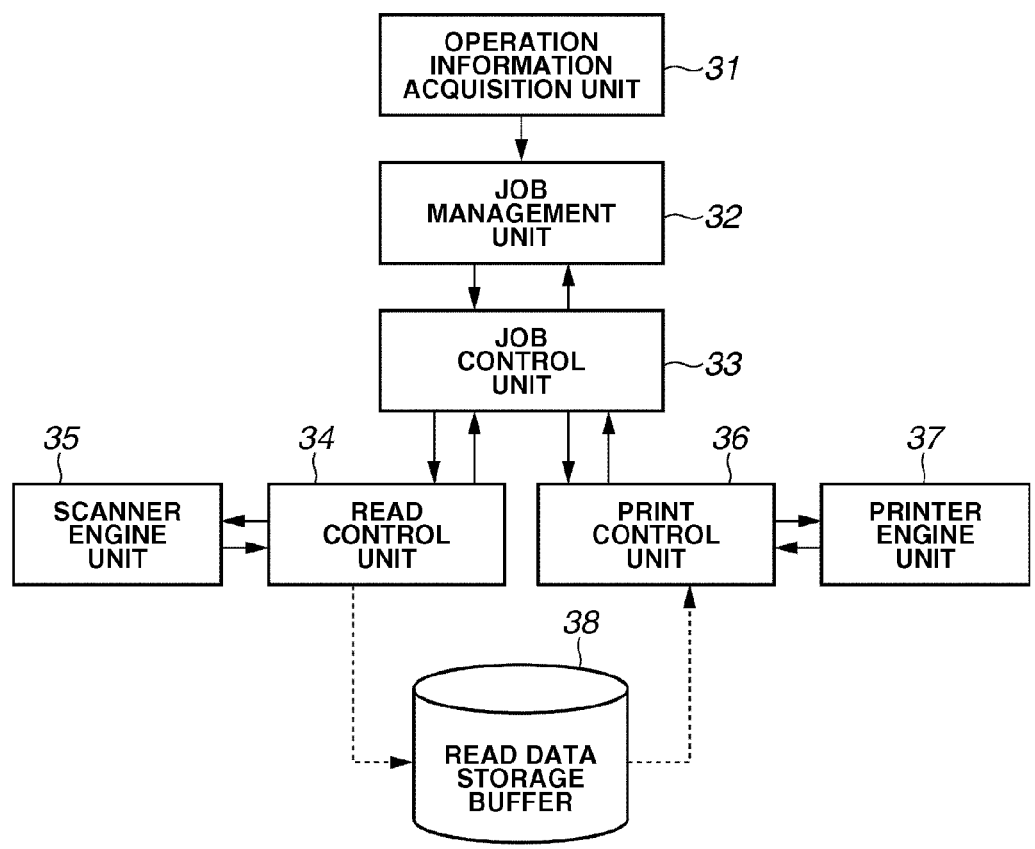
FIG. 4 is a functional block diagram of a program stored in a read-only memory (ROM).

FIG. 4 is a functional block diagram of a program stored in the ROM 1. Blocks not involved in copying processing are not described here.

The program includes an operation information acquisition unit 31, a job management unit 32, a job control unit 33, a read control unit 34, a scanner engine unit 35, a print control unit 36, and a printer engine unit 37. Further, a read data storage buffer 38 is optionally secured in the RAM 2 in a copying operation or the like.

Job settings input by a user via the operation unit 4, for example, settings about a copy mode, a recording sheet size, a recording sheet type, a magnification, and color/monochrome mode are stored by the operation information acquisition unit 31. When the user completes setting and presses the copying start key, the operation information acquisition unit 31 instructs the job management unit 32 to start a job, notifying the unit 32 of the stored setting information.

The job management unit 32 interprets the notified setting information and instructs the job control unit 33 to execute a job. The job control unit 33 instructs the read control unit 34 and the print control unit 36 to read and print data as needed so as to execute the job in response to the instruction from the job management unit 32.

The read control unit 34 controls a scanner engine unit to obtain read data and optionally performs various types of image processing to store the resultant data in the read data storage buffer 38 according to the job instructed by the job control unit 33.

The print control unit 36 receives the read data stored in the read control unit 34 through the read data storage buffer 38 when making prints. Then, the print control unit 36 allocates the read data to a print area and performs various types of image processing to generate print data in response to the job instructed by the job control unit 33. Finally, the print control unit 36 controls the printer engine unit 37 to execute image formation based on the print data.

It is assumed here that the MFP 100 can perform the following functions based on programs stored in the ROM 1:
(1) A "1× copying" function of copying a document to a recording sheet at the same magnification (100%);
(2) A "specified-magnification copying" function of copying a document to a recording sheet at any specified magnification ratio;
(3) A "standard-size variable-power copying" function of copying a certain size of document, for example, an A4-sized document to a certain size of recording sheet, a B5-sized sheet;
(4) An "automatic variable-power copying" function of automatically detecting a document size or position to enlarge a document image at the best magnification with respect to a recording sheet;
(5) A "repeated copying (manual)" function of repeatedly copying a document to a recording sheet as many times as a user specifies;
(6) A "repeated copying (automatic)" function of automatically detecting a document size or position to repeatedly copy a document to a recording sheet as many as possible;
(7) A "2 in 1 copying" function of allocating and copying two A4-sized documents to one A4-sized recording sheet; and
(8) A "4 in 1 copying" function of allocating and copying four documents to one recording sheet.

Figure 5:
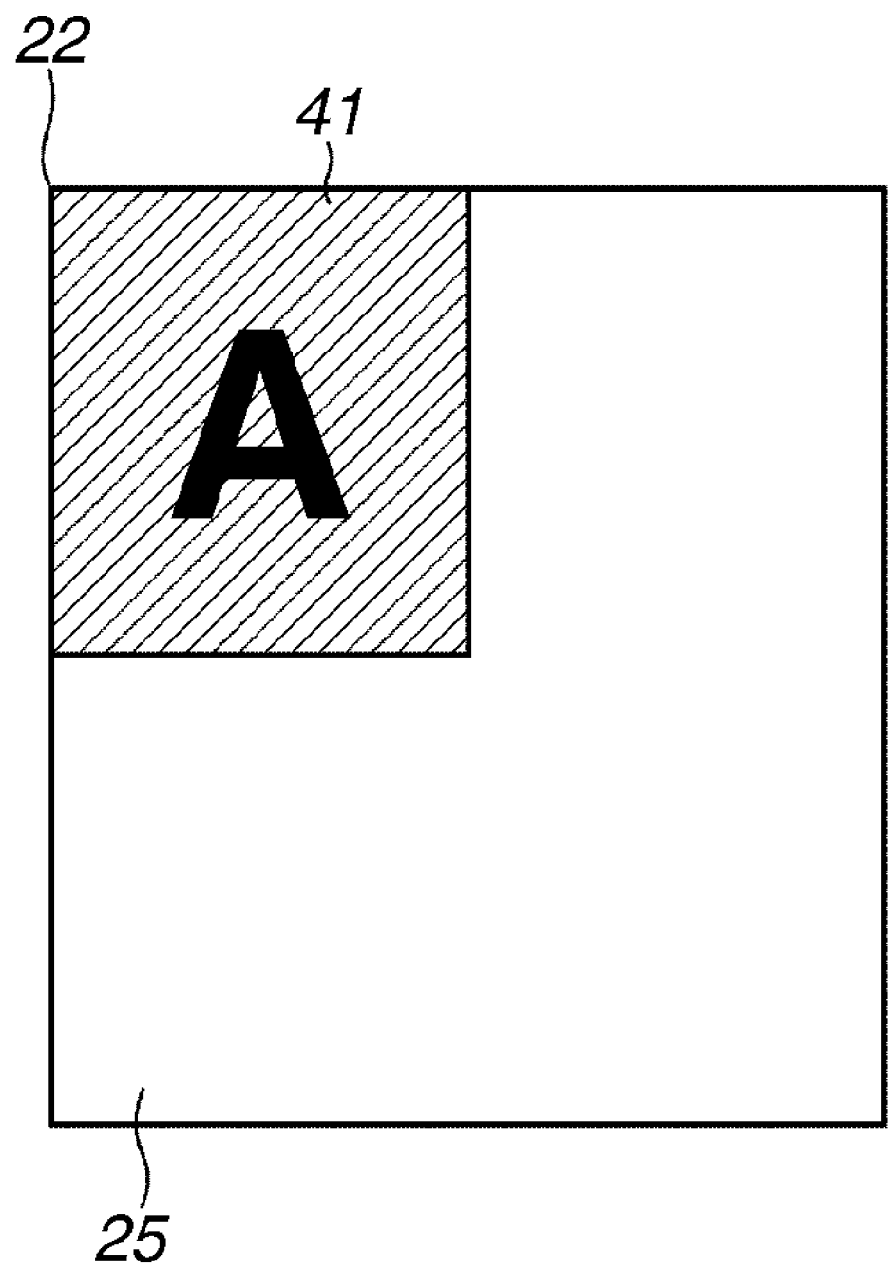
FIG. 5 illustrates an example showing how a document is set on a document positioning plate.
Figure 16A:
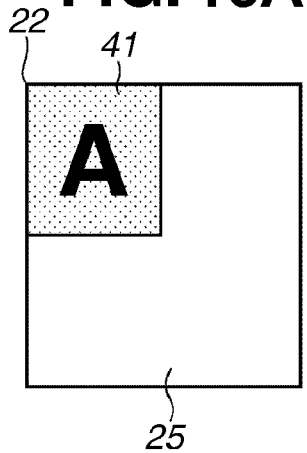
FIGS. 16A to 16F illustrate examples of features and problems of various techniques.
Figure 16B:
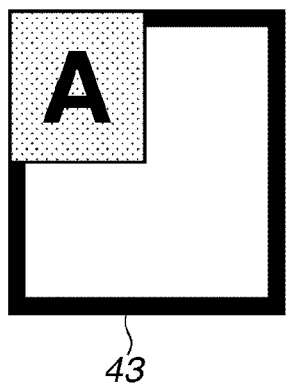
Figure 16C:
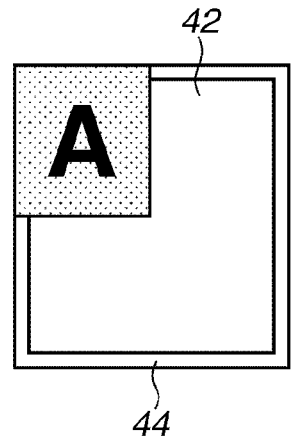
Figure 16D:
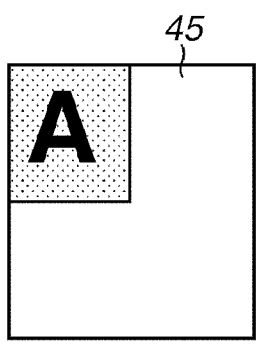
Figure 16E:
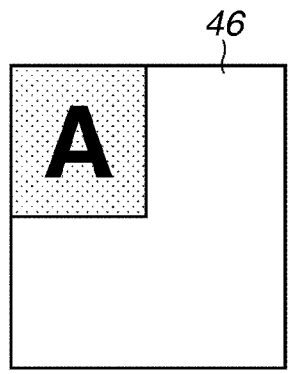
Figure 16F:
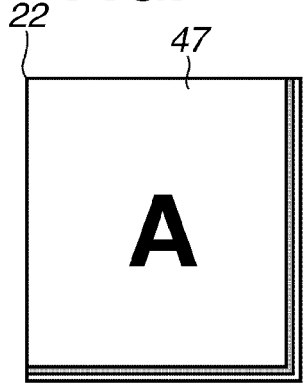

FIG. 5 illustrates an example showing how a document 41 is set on the document positioning plate 25. In the following description, it is presumed that the document 41 is set appropriately in alignment with the document stop position 22 as illustrated in an upper left portion of FIG. 5, and the document 41 stays within the analysis-target area. In the embodiment, the analysis-target area has the increased size featured in the analysis-target area 46 of FIG. 16E.

When performing the reading operation, the read unit determines whether a set copy mode among the job settings input by a user with the operation unit 4 requires document detection. For example, if a copy mode set by the user is (4) "automatic variable-power copying" or (6) "repeated copying (automatic)", document detection is required.

Figure 6:
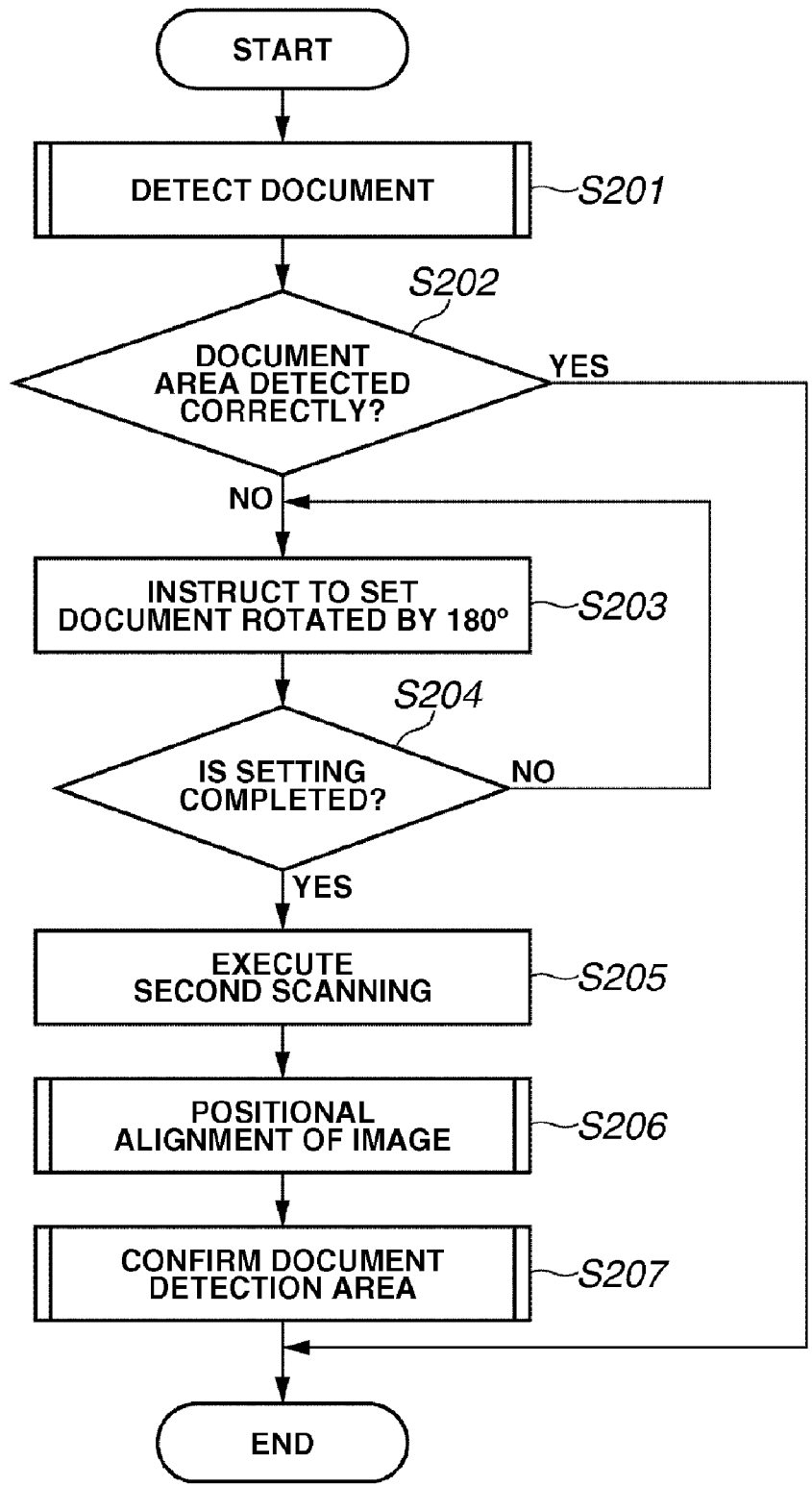
FIG. 6 is a flowchart of a document detection operation of the MFP according to the first exemplary embodiment of the present invention.

FIG. 6 is a flowchart of a document detection operation executed if the read unit determines that a set copy mode requires document detection. FIGS. 7A-E illustrate aspects of the processing of FIG. 6. Each step of the following processing is carried out by the CPU 20 executing programs stored in the ROM 1.

In step S201, the CPU 20 performs temporary document detection. As a specific example of the document detection method, methods discussed in the description of the related art may be employed. However, any method capable of detecting a document can be employed.

In step S201, if a document stays within an analysis-target area as illustrated in FIG. 5, for example, a satisfactory document detection result is obtained. In such case, a result of temporary document detection is adopted as a final document detection result.

Figure 7A:
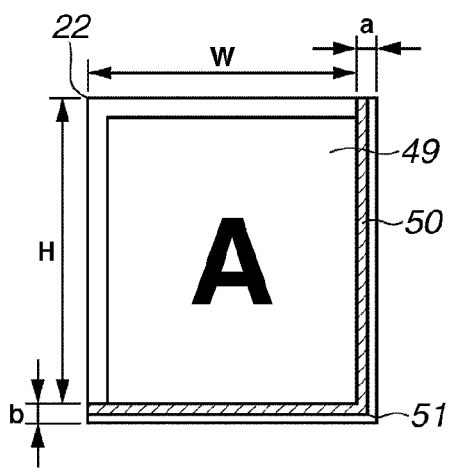
FIGS. 7A to 7E illustrate an example of how a document set on a document positioning plate extends off an analysis-target area.

On the other hand, there is a possibility that a document extends off the analysis-target area. FIG. 7A illustrates such a state. As apparent from FIG. 7A, a document 49 extends off the analysis-target area of the document positioning plate 25. In the following description, vertical and horizontal directions of a document are determined with reference to a character ("A" in this example) recorded on the document.

As illustrated in FIG. 7A, if a lower right edge 51 of the document extends off of the analysis-target area, a lower right end area 50 of the document 49 is not detected. As a result, an area not including the lower right end area 50 of the document is detected. Thus, in step S201, document area data 52 of FIG. 7B is obtained.

Figure 7B:
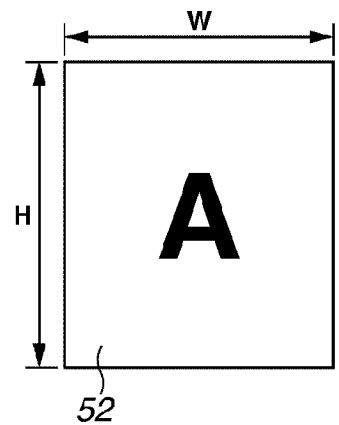

As apparent from FIG. 7B, if the entire analysis-target area is detected as a document in step S201, the lower right end area 50 of the document is missed. In this example, the document 49 is set in alignment with the document stop position 22. Hence, according to the above techniques of the related art, an analysis-target area includes an upper left area of a pre-scanning image, and the upper left area is not cut off.

in step S202, the CPU 20 determines whether a document area is correctly detected according to whether the detected document stays within the analysis-target area. In particular, the CPU 20 determines whether at least one of a condition that a width of a detected document matches a width of an analysis-target area and a condition that a height of a detected document matches a height of an analysis-target area is satisfied based on the result obtained in step S201.

If at least one condition is satisfied (NO in step S202), the processing advances to step S203. Otherwise, (YES in step S202), the CPU 20 determines that a document is detected well, and the document detection processing is completed.

Further, even in the cases where both of a right edge and a lower edge do not extend off, if a width of a detected document matches a width of an analysis-target area, the CPU 20 determines that a right edge of a document is missing. Further, if a height of the document matches a height of the analysis-target area, the CPU 20 determines that a lower edge of a document is missing.

In step S203, the CPU 20 prompts a user to rotate a document by 180°, set the document, and press an enter key to continue the processing. More particularly, the CPU 20 prompts a user to set the document under the condition of FIG. 7C. As a method of prompting a user, for example, an instruction to a user may be displayed on the display unit 5 or guided by voice.

In step S204, the operation unit 4 determines whether a user presses an enter key to continue the processing. If pressed (YES in step S204), the processing advances to step S205. At this time, a message for a user displayed on the display unit 5 in step S203 is deleted.

By pressing the enter key to continue the processing, the user indicates that the document has already been rotated by 180° and set. If a user does not press the enter key to continue the processing (NO in step S204), the processing returns to step S203, the CPU 20 displays a message for a user and waits for the user to press the enter key to continue the processing.

In step S205, the CPU 20 performs a second scanning of the document 49. More particularly, the document 49 is set with the document lower right edge 51 aligned with the document stop position 22 as illustrated in FIG. 7C, and scanned under this condition to obtain the document area data 54 of FIG. 7D.

In step S201, the CPU 20 determines that a document extends off the analysis-target area, accordingly, document detection can be omitted in step S205. Thus, the document area data 54 can be obtained by removing data outside the analysis-target area from the data obtained by scanning the entire document positioning plate. In this example, a lower right end area of the document is included, for example, because the document 49 has been rotated by 180° and set prior to the second scanning.

Figure 7C:
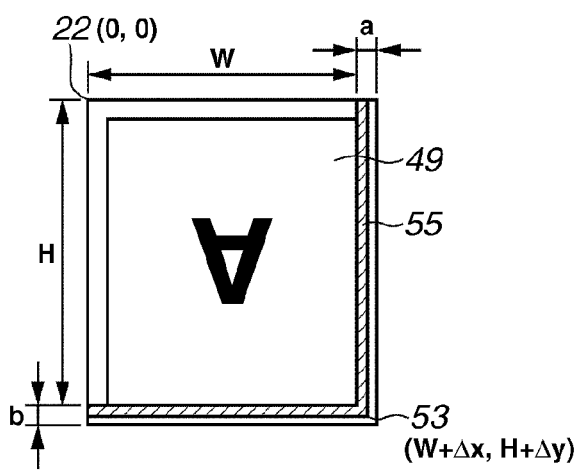

The document lower right edge 51 of FIG. 7A and the document upper left edge 53 of FIG. 7C fall in a rectangular area corresponding to a (a×b) size of the lower right end of the document positioning plate. Thus, if the document stop position 22 is set as the origin (0, 0), an x coordinate axis is set to a rightward direction, and a y coordinate axis is set to a downward direction in FIG. 7C, positional coordinates of the document upper left edge are expressed as follows.

Positional coordinates of the document upper left edge 53 of FIG. 7C: (W+Δx, H+Δy)

where $0 \leq \Delta x < a$, $0 \leq \Delta y < b$, W denotes an analysis-target area width, and H denotes an analysis-target area height. Thus, a document position (size) can be determined by calculating values of Δx and Δy.

A method of calculating values of Δx and Δy in step S206 and a method of determining a document area in step S207 are described below.

Figure 7D:
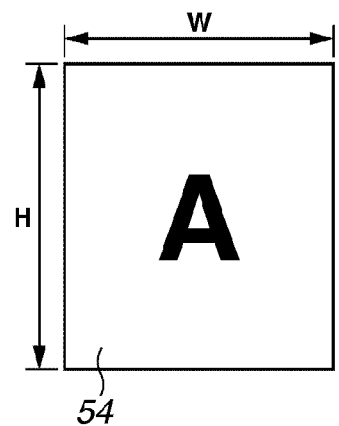
Figure 7E:
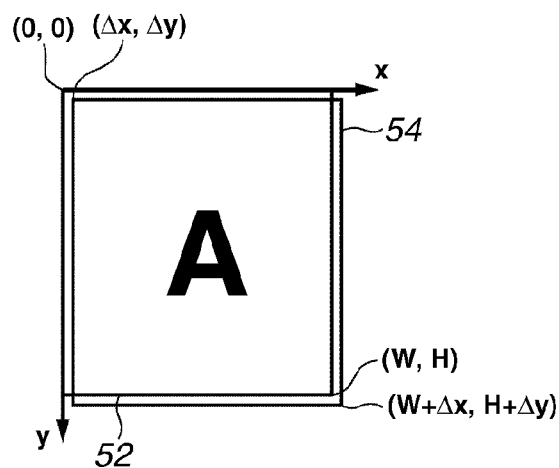

In step S206, the CPU 20 superimposes the first document area data obtained in step S201 and the second document area data obtained in step S205 on each other as illustrated in FIG. 7E. To be specific, the CPU 20 superimposes the first document area data obtained in step S201 as illustrated in FIG. 7B and the second document area data obtained in step S205 as illustrated in FIG. 7D on each other based on common read image data (character "A" in this example) used as a reference. Further, various known pattern matching techniques are applicable to positional alignment as described in detail below.

Here, the first document area data includes upper left edge data of the document, while the second document area data includes lower right end data of the document. As is understood from the above, in the data area superimposed as illustrated in FIG. 7E, an offset of the second document area data from the first document area data FIG. 7E corresponds to Δx and Δy. In other words, values of Δx and Δy can be calculated.

In step S207, the CPU 20 confirms the document detection area by setting the document stop position as the origin and determining an area from the origin (0, 0) to (W+Δx, H+Δy) as a document area in consideration of the values Δx and Δy calculated in step S206.

Figure 8:
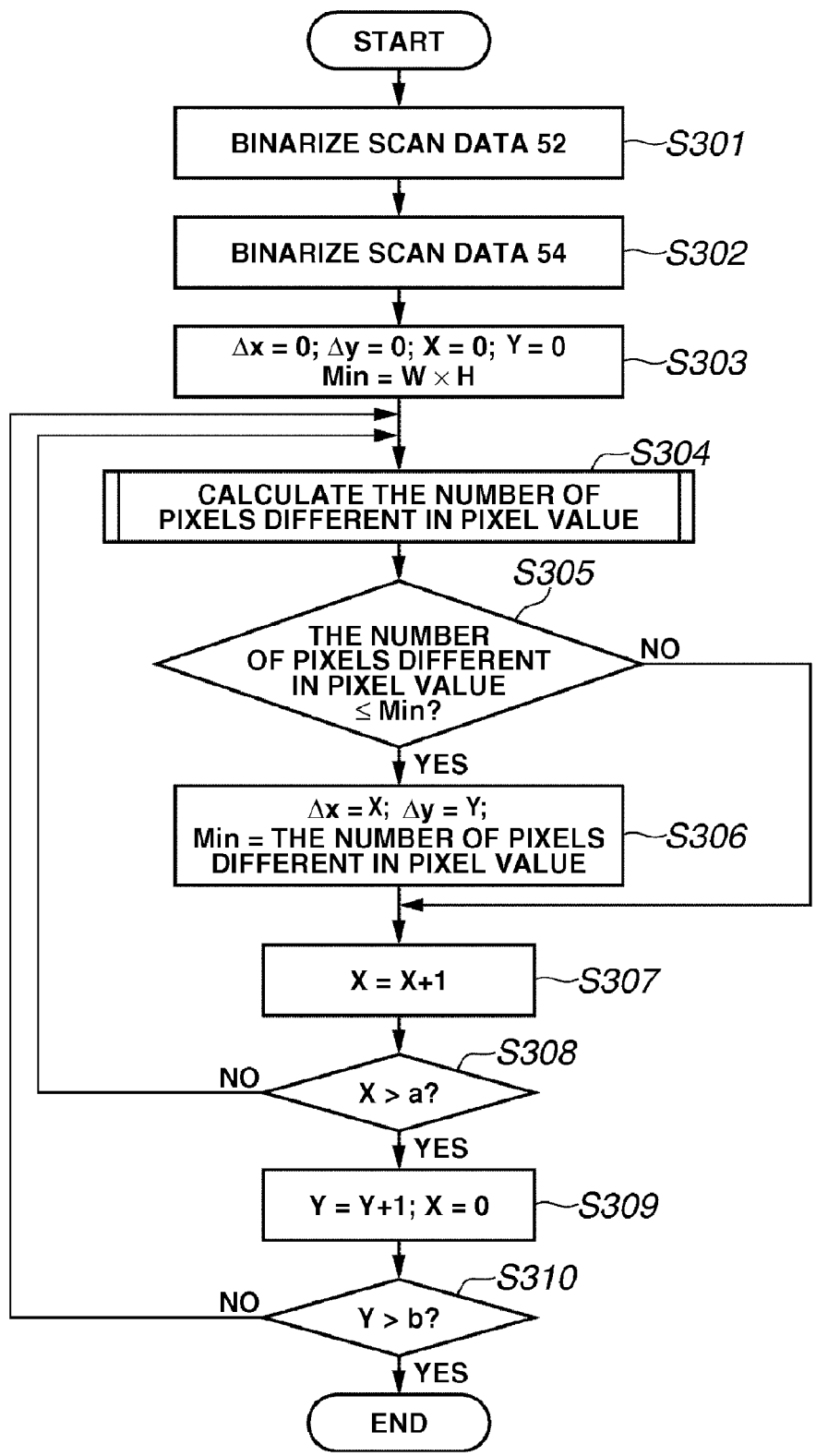
FIG. 8 is a detailed flowchart illustrating a positional alignment processing.

FIG. 8 is a detailed flowchart illustrating the positional alignment processing described in step S206. In this example, as illustrated in FIG. 7E, the upper left edge of the document area data 52 detected in step S201 is set as the origin (0, 0).

In step S301, the CPU 20 digitizes the document area data 52 obtained in step S201.

In step S302, the CPU 20 digitizes the document area data 54 obtained in step S205. Therefore, one document area data may be rotated by 180° such that the two data are oriented in the same direction. Further, the CPU 20 may perform calculation considering a rotational angle at the time of calculating the number of pixels different in pixel value. In this example, the data is rotated by 180° in advance and the resultant data is used for subsequent processing.

In step S303, the CPU 20 initializes target Ax and Ay to zero and initializes a variable Min used in subsequent determination processing to W×H and initializes variables X and Y to 0.

In step S304, the CPU 20 calculates the number of pixels different in pixel value based on the following expression.

number of pixels different in pixel value =

$$\sum_{i=0}^{I}\sum_{j=0}^{J} |f_1(i+x, j+y) - f_2(i, j)|$$

where:

$f_1$(m, n) is the density value of an image obtained by digitizing the document area data 52 obtained in S201 in a position (m, n);

$f_2$(m, n) is the density value of an image obtained by digitizing the document area data 54 obtained in S205 in a position (m, n);

i, j are integers;

I=W−a;

J=H−b;

x represents the directional offset of $f_2$ from $f_1$ in the x direction; and y represents the directional offset of $f_2$ from $f_1$ in the y direction.

In the loop processing, the loop variables X and Y initialized in steps S303 are substituted for x and y of the above expression. Further, the expressions of "I=W−a" and "J=H−b" are determined in consideration of the maximum offset a in the x direction and the maximum offset b in the y direction when the detection is performed.

In step S305, the CPU 20 compares the number of pixels different in pixel value calculated in step S304 with the variable Min. If the number of pixels different in pixel value is equal to or smaller than the variable Min (YES in step S305), the processing advances to step S306. In step S306, the CPU 20 determines that the two data are superimposed on each other well and stores X, Y, the number of pixels different in pixel value obtained at this time as Δx, Δy, and Min. If the number of pixels different in pixel value is not (equal to or smaller than) the variable Min (NO in step S305), the processing skips step S306. In steps S307 to S310, the above processing executed in steps S304 to S306 is repeated with a range of X=0 to a and Y=0 to b. In step S307, X is incremented by 1. In step S308, the control unit determines whether X exceeds a. If the control unit determines that X does not exceed a in step S308 (NO in step S308), the processing returns to step S304. On the other hand, if the control unit determines that X exceeds a in step S308 (YES in step S308), the processing advances to step S309. Then, the control unit initializes X to 0, and increments Y by 1. In step S310, the control unit determines whether Y exceeds b. If the control unit determines that Y does not exceed b in step S310 (NO in step S310), the processing returns to step S304. On the other hand, if the control unit determines that Y exceeds b in step S310 (YES in step S310), the processing flow is terminated.

The CPU 20 repeats the processing a plurality times within a range of X=0 to a and Y=0 to b and detects Δx and Δy, which involve the minimum number of pixels different in pixel value. As described above, according to the first exemplary embodiment, the CPU 20 can determine a document position (size) with higher accuracy based on two data scanned in different directions.

The CPU 20 may accept any user's operation at certain timing in the above processing. For example, a user may press a cancel key or a power key to cancel or terminate the processing.

As for physical components added to any conventional image processing apparatus, this exemplary embodiment includes a memory capable of storing read data for a plurality of read operations. The processing can be executed based on a software program. Thus, the existing document positioning plate suffices for the purpose without physically enlarging its area, which leads to advantages in terms of size reduction, productivity, and cost. Further, the apparatus can be implemented by a single image sensor and thus lower cost, and more compact design can be realized in the apparatus compared with an apparatus using a plurality of sensors or any special sensor.

In addition, in the above described case, the document 49 extends off the analysis-target area in both of the width (horizontal) direction and the height (vertical) direction as illustrated in FIG. 7A. In practice, there is a possibility that the document extends off the analysis-target area only in the horizontal or vertical direction as described above. However, even in this case, if the apparatus is structured as above described, the processing of the first exemplary embodiment is similarly applicable thereto.

Figure 9A:
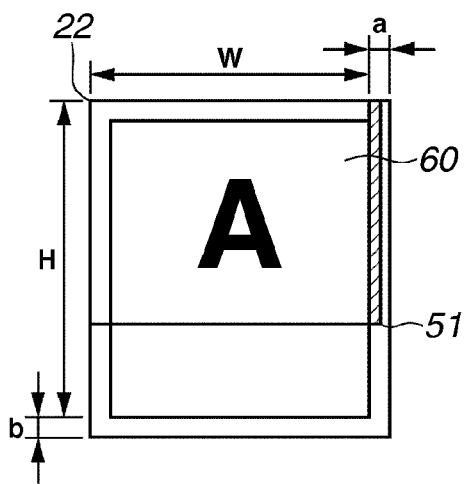
FIGS. 9A to 9E illustrate an example showing how a document set on a document positioning plate extends off an analysis-target area in its width direction alone.
Figure 9B:
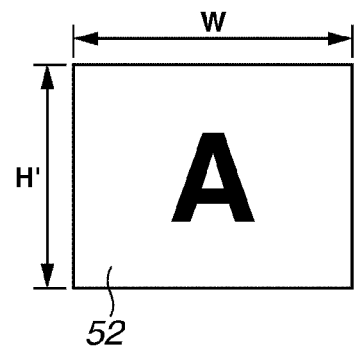
Figure 9C:
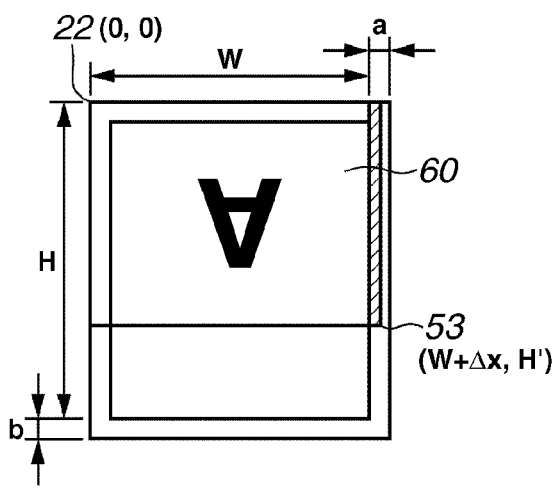
Figure 9D:
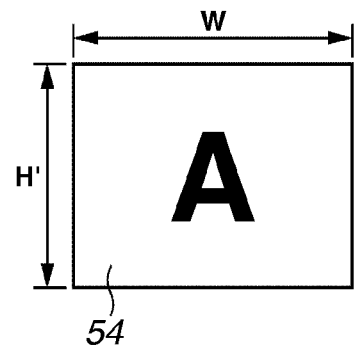
Figure 9E:
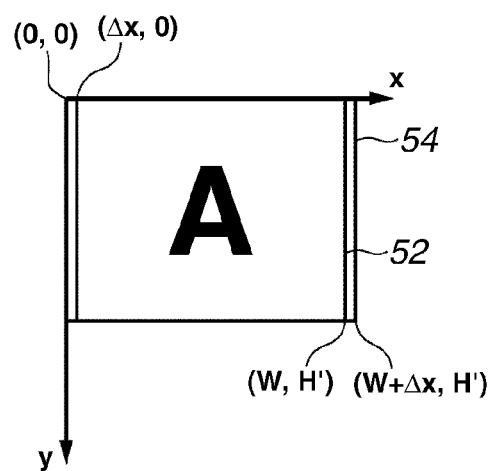

FIGS. 9A to 9E illustrate an example of a case where a document 60 extends off the analysis-target area only in the width (horizontal) direction. A document 60 set as illustrated in FIG. 9A upon scanning yields document area data 52 illustrated in FIG. 9B. The document is rotated by 180° and set as shown in FIG. 9C, for example, by the user upon prompting by CPU 20, and a second scanning is performed to obtain document area data 54 as shown in FIG. 9D. The documents data areas 52 and 54 are superimposed on each other based on common read image data (character "A" in this example) used as a reference. As apparent from FIGS. 9A to 9E, in this case, the apparatus is structured to detect an area from the origin (0, 0) to (W+Δx, H') as a document area.

FIGS. 10A to 10E illustrate an example of a case where a document 70 extends off the analysis-target area only in the height (vertical) direction. The process is the same as that described above respect to the respective FIGS. 9A to 9E except that extra vertical length replaces extra horizontal width. As apparent from FIGS. 10A to 10E, in this case, the apparatus is structured to detect an area from the origin (0, 0) to (W', H+Δy) as a document area.

Provided that the two document area data are associated together, the CPU 20 has only to check an area in the x direction or y direction when positional alignment is performed in step S206.

Figure 10A:
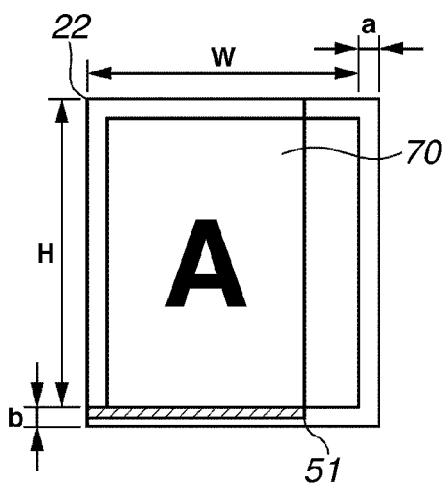
FIGS. 10A to 10E illustrate an example showing how a document set on a document positioning plate extends off an analysis-target area in its height direction alone.
Figure 10B:
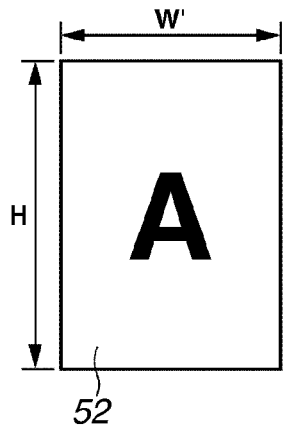
Figure 10C:
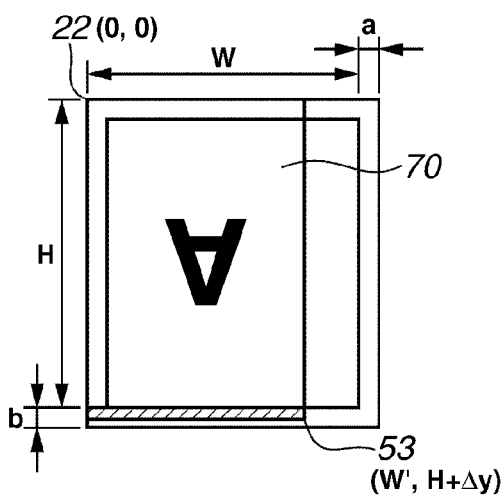
Figure 10D:
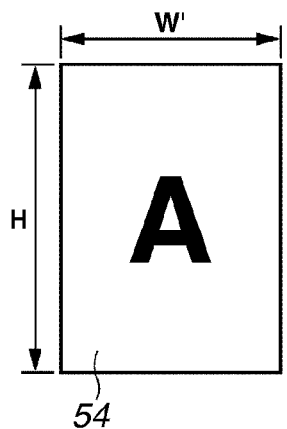
Figure 10E:
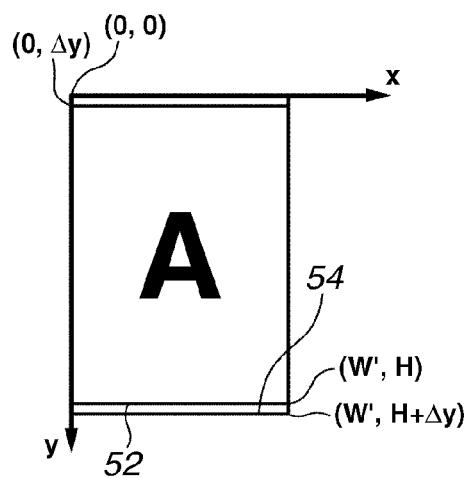
Figure 11:
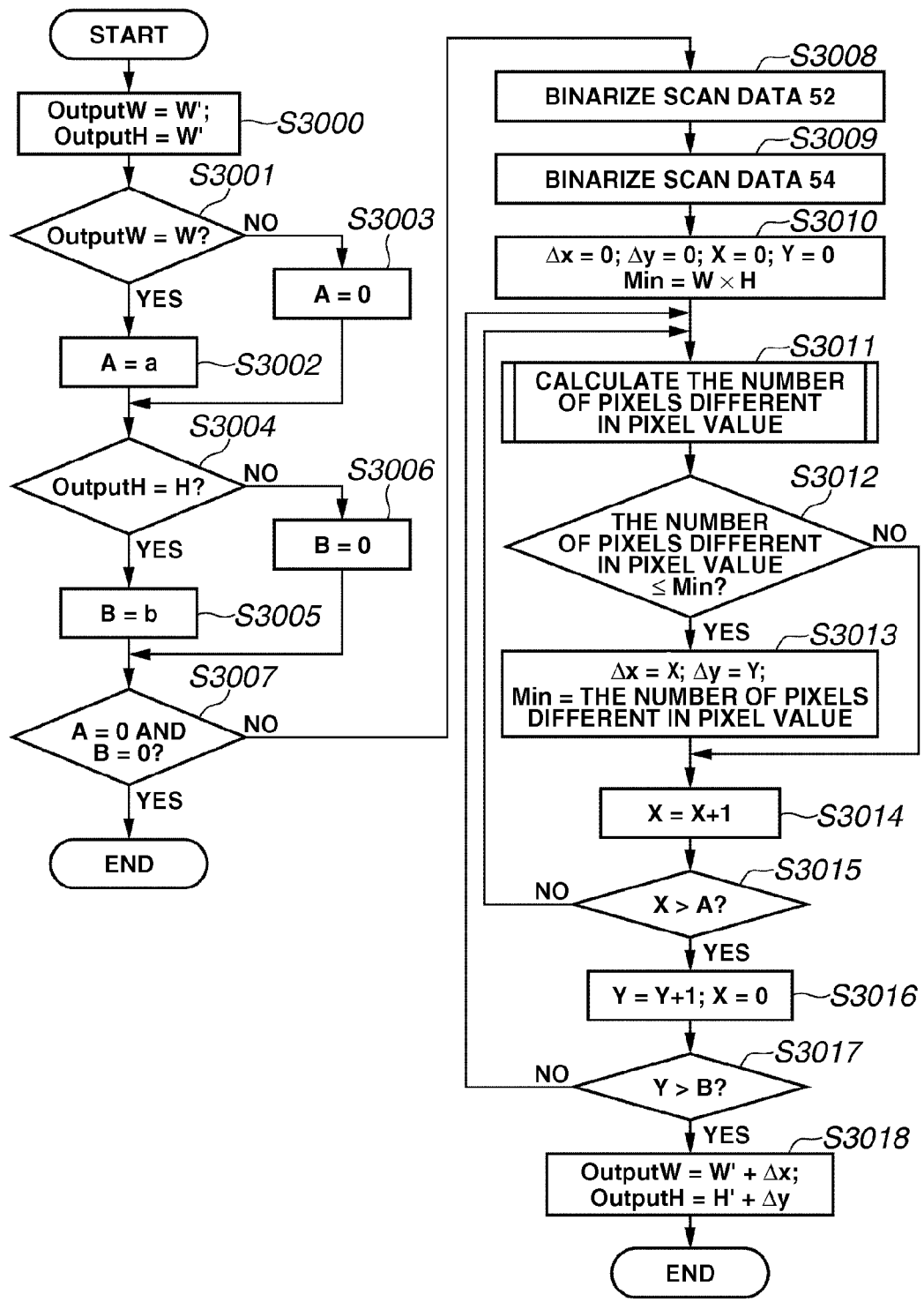
FIG. 11 is an operational flowchart applicable to any one of the three cases.

FIG. 11 is an operational flowchart applicable to any one of the three cases of FIG. 7A, FIG. 9A, and FIG. 10A. In FIG. 11, OutputW denotes a document detection width determined through this flow, and OutputH denotes a document detection height determined through this flow. Further, W' denotes a document detection width determined in step S201. Likewise, H' denotes a document detection height determined in step S201. Further, W denotes an analysis-target area width, and H denotes an analysis-target area height.

In step S3000, the CPU 20 substitutes W' for OutputW and substitutes H' for OutputH. In step S3001, the CPU 20 compares OutputW with W to determine whether a document extends off the analysis-target area in a width direction.

If the document extends off the analysis-target area (YES in step S3001), the CPU 20 sets the detection width A to a so as to detect an area in the x direction in subsequent image positioning process, in step S3002. If the document does not extend off the analysis-target area (NO in step S3001), detection is unnecessary, so that the CPU 20 sets the detection width A to 0 in step S3003.

In step S3004, the CPU 20 compares OutputH with H and determines whether the document extends off the analysis-target area in the height direction. If the document extends off the analysis-target area (YES in step S3004), the CPU 20 sets the detection height B to b so as to detect an area in the y direction in subsequent image positioning process, in step S3005. If the document does not extend off the analysis-target area (NO in step S3004), detection is unnecessary, so that the CPU 20 sets the detection height B to 0 in step S3006.

In step S3007, the CPU 20 checks whether both of the detection width A and the detection height B are set to 0. In this example, if the width and the height are both set to 0 (YES in step S3007), detection is unnecessary, and a satisfactory document detection result was obtained in step S201. Thus, the processing is terminated.

If at least one of the width A and the width B is not set to 0 (NO in step S3007), a satisfactory document detection result was not obtained in step S201, and the processing advances to step S3008. Subsequent steps S3008 to S3018 are substantially similar to the steps of FIG. 8, so that only differences in the processing will be described.

Using steps S3014 and S3015, the CPU 20 executes a detection loop in the x direction. More particularly, whereas in FIG. 8 the CPU 20 executes detection in a range of 0 to a in steps S307 and S308; in FIG. 11, using steps S3014 and S3015 to provide branching for the detection loop in the x direction, the CPU 20 executes detection in a target area. Whether to execute detection is determined based on parameters obtained in steps S3001 to S3003.

Using steps S3016 and S3017, the CPU 20 executes a detection loop in the y direction. More particularly, whereas in FIG. 8 the CPU 20 executes detection in a range of 0 to b in steps S309 and S310; in FIG. 11, using steps S3016 and S3017 to provide branching for the detection loop in the y direction, the CPU 20 executes detection in a target area. Whether to execute detection is determined based on parameters obtained in step S3004 to S3006.

In step S3018, the CPU 20 calculate the OutputW and OutputH based on the following expression using $\Delta x$ and $\Delta y$ determined in the above processing and the detection results W' and H' in step S201.

$$\text{Output}W = W' + \Delta x$$

$$\text{Output}H = H' + \Delta y$$

With the above processing, even if a user sets a document with at least one of the right edge and the lower edge extending off the analysis-target area, the apparatus can detect the document correctly. The above processing of the first exemplary embodiment as shown in FIG. 8 may increase a processing load depending on values of W, H, a, and b. To that end, it is desirable to reduce an area (detection range) used for positional alignment as follows.

Figure 12A:
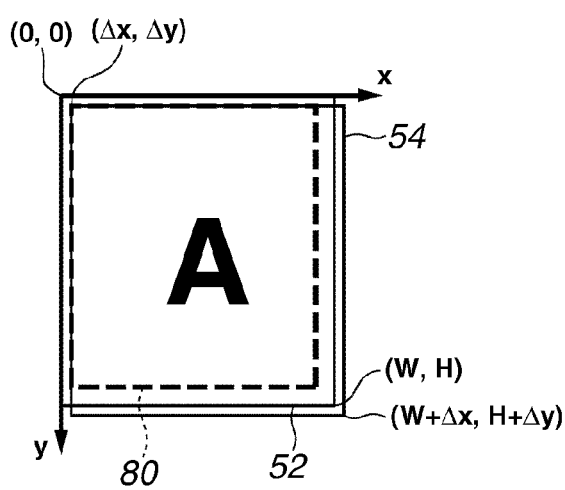
FIGS. 12A to 12D illustrate an area for calculating the number of pixels different in pixel value.
Figure 12B:
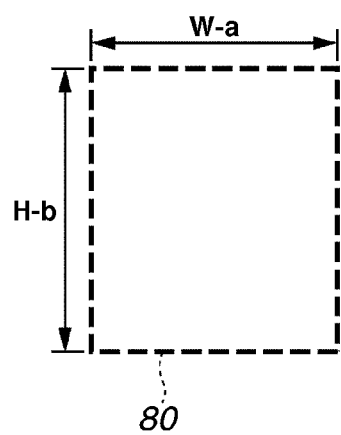
Figure 12C:
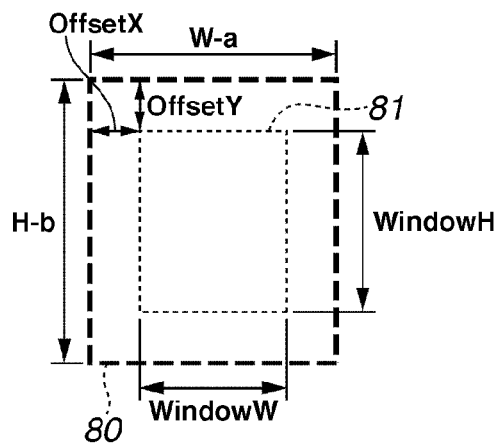

Reference is now made to FIGS. 12A-12D and again to FIG. 8. FIG. 12A illustrates an area used for calculating the number of pixels different in pixel value in step S304 of FIG. 8. This area corresponds to an area 80 used for positional alignment. The area 80 has a width "W−a" and a height "H−b" as illustrated in FIG. 12B. FIG. 12C illustrates an additional area 81 set for positional alignment, which is limited compared with the area 80.

As shown in FIG. 12C, the area 81 has a width of WindowW and a height of WindowH. Further, the area 81 involves offsets OffsetX and OffsetY from the area 80. The OffsetX, OffsetY, WindowW (<W−a), and WindowH (<H−b) are preset parameters.

Figure 12D:
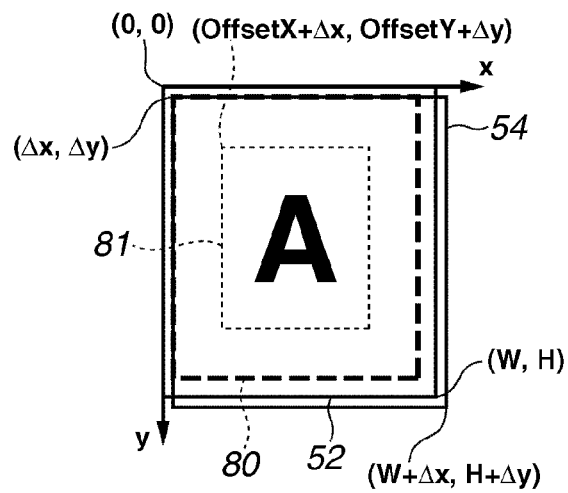

In this case, it is desirable to remove edge data from the area for positional alignment so that an influence of color drift in an edge portion of the document can be avoided. In addition, these parameters are set so as to balance a processing load with an image positioning accuracy in consideration of characteristics of the MFP 100 or document. FIG. 12D illustrates the area 81 added to FIG. 12A.

Considering a positional relationship between the area 80 and the area 81 of FIGS. 12A to 12D, the CPU 20 calculates number of pixels different in pixel value based on the following expression in step S304.

number of pixels different in pixel value =

$$\sum_{i=0}^{I'} \sum_{j=0}^{J'} |f_1(i + x + \textit{OffsetX}, j + y + \textit{OffsetY}) - f_2(i + \textit{OffsetX}, j + \textit{OffsetY})|$$

in pixel value where:
$f_1(m, n)$ is the density value of an image obtained by digitizing the document area data 52 obtained in S201 in a position (m, n);
$f_2(m, n)$ is the density value of an image obtained by digitizing the document area data 54 obtained in S205 in a position (m, n);
i, j are integers;
I'=WindowW;
J'=WindowH;
x represents the directional offset of $f_2$ from $f_1$ in the x direction; and
y represents the directional offset of $f_2$ from $f_1$ in the y direction.

In this way, the area for positional alignment is narrowed down to reduce a processing load for positional alignment and to increase a document detection speed. In the above description, the CPU 20 determines whether a document stays within the analysis-target area, and if the document extends off the area, the CPU 20 prompts a user to rotate the document by 180° and set the document.

However, in the case where a scanning image is shaded, for example, even if a document stays within the analysis-target area, the apparatus might erroneously detect a document size. Therefore, even if the CPU 20 omits determination as to whether the document stays within the analysis-target area, the present invention is effective.

In this case, the CPU 20 may adjust positions of image data obtained by scanning the entire document positioning plate including a document and then detect a document area to determine a document size instead of detecting a document area when scanning is performed in the above related art. In the above description, a lower right area of the document extends off the analysis-target area. However, even if an upper left area of the document extends off the analysis-target area, similar effects can be obtained.

Further, in the above description, the corner of the document is aligned with a reference position. However, even if a user sets a document with its side aligned with one side of the document positioning plate as a reference, similar effects can be attained.

In this example, a block matching technique using digitized data is described, but as described in the first exemplary embodiment, various positioning techniques are applicable.

Second Exemplary Embodiment

A second exemplary embodiment of the present invention describes a mode for reading data with higher quality. The apparatus configuration is similar to the MFP 100 of the first exemplary embodiment and thus is not described here.

FIGS. 13A to 13G illustrate an example of scanning of a document on the document positioning plate 101 with dust, stains, and scratch 102. In this case, if a document 103 is set as illustrated in FIG. 13B and scanned, noise is superimposed on scanned data 104 as illustrated in FIG. 13C.

However, the scratch on the document positioning plate is not shifted if the document is moved. As illustrated in FIGS. 13D to 13G, if the document position is changed, a relative position of the dust, stain, and scratch 102 on the document positioning plate is shifted.

Figure 14:
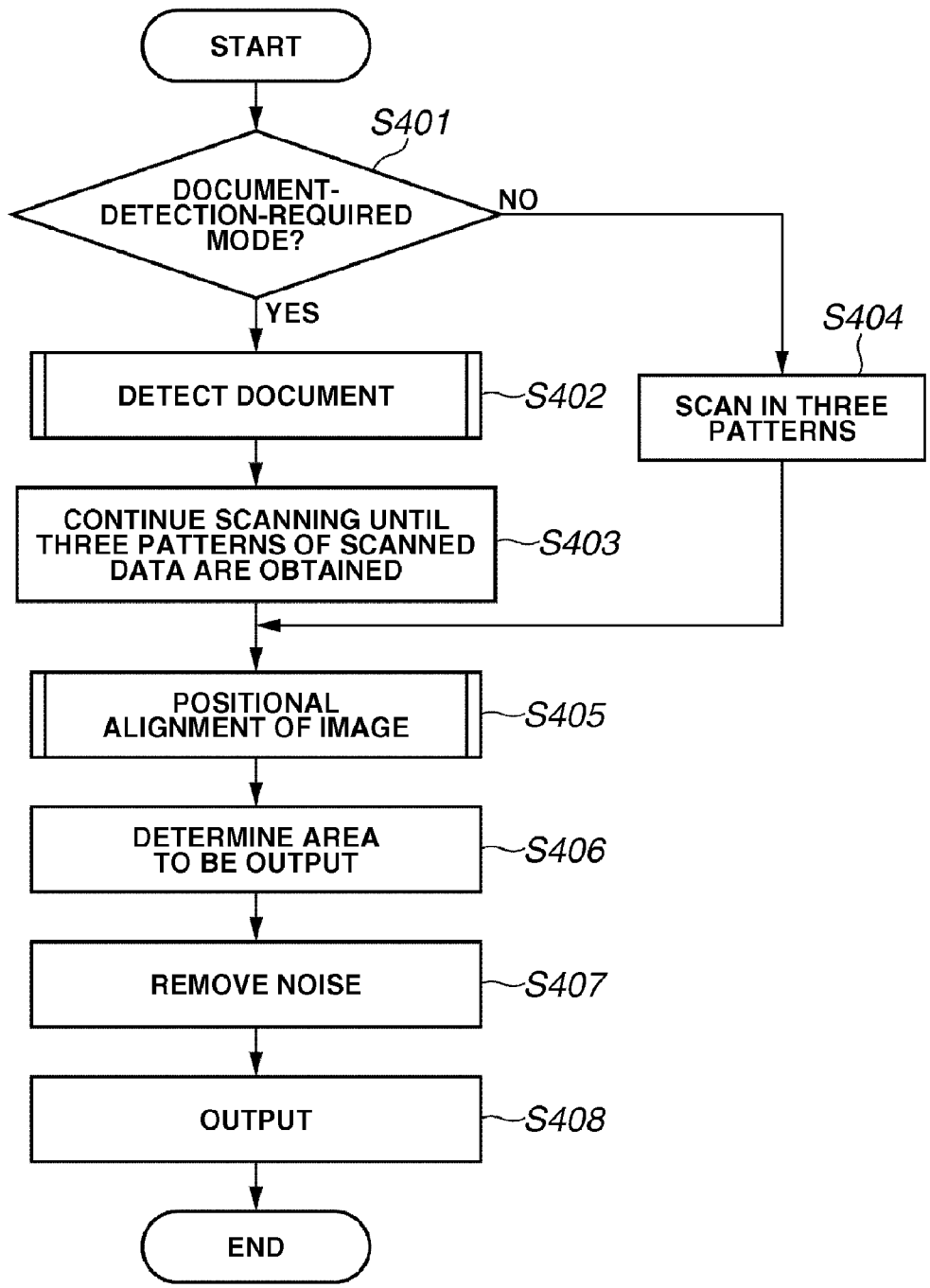
FIG. 14 is a flowchart illustrating a denoising operation of an MFP according to a second exemplary embodiment of the present invention.

To be specific, scanned data 105 of FIG. 13E and scanned data 106 of FIG. 13G are obtained. Based on the above described, noise is removed through the following operation. FIG. 14 is a flowchart illustrating a denoising operation of the MFP 100 according to the second exemplary embodiment.

In step S401, the CPU 20 analyzes job information designated by a user and determines whether a designated mode requires document detection. If the mode requires document detection (YES in step S401), the processing advances to step S402. On the other hand, if the mode requires no document detection (NO in step S401), the processing advances to step S404.

The CPU 20 performs the above determination for the following reason. In the MFP 100, if the copying mode (function) that requires no document detection is selected, a size of a read document is uniquely determined based on the job settings input by a user. On the other hand, the copying mode (function) that requires document detection is selected, a document is scanned based on a document detection result, or a size of a data area to be printed out of the read data is determined.

In step S402, the CPU 20 executes the document detection processing. As to a specific document detection method, the techniques discussed in the description of the related art may be employed. However, any method capable of detecting a document may be employed. In this example, it is assumed that the CPU 20 executes the document detection processing described in the first exemplary embodiment with reference to FIG. 8 (or FIG. 11).

In step S403, the CPU 20 scans the same document in three different positions to obtain three scanned data. Since the CPU 20 has already obtained the two scanned data when the document detection is performed in step S402 in this example, the CPU 20 executes scanning one more time. The additional scanning needs to be executed in document position and orientation different from those set in the two scanning operations in step S402.

In step S404, the CPU 20 scans a document in different document positions and orientations so as to obtain three scanned data that are superimposed with noise in different portions as illustrated in FIGS. 13C, 13E, and 13G. At this time, the following condition may be set. Here, the CPU scans the document set in alignment with the reference position of the document positioning plate once out of three times.

Figure 15A:
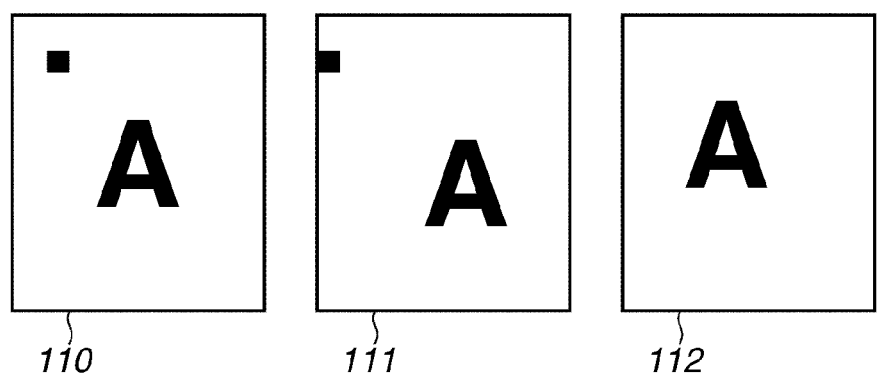
FIGS. 15A to 15D illustrate an example of a positioning operation according to the second exemplary embodiment of the present invention.

The CPU 20 notifies a user of document setting conditions using the display unit 5. The CPU 20 stores this information, for example, which of four corners of the document positioning plate is used as a document stop position, which direction the document is set in, or the like. This information is used for subsequent image positioning processing in step S405. In this example, it is assumed that the CPU 20 obtains three scanned data 110 to 112 in step S404 as illustrated in FIG. 15A.

Figure 15B:
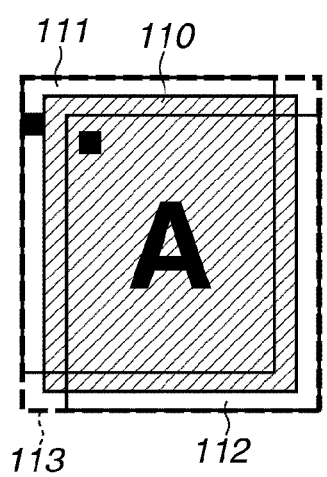

In step S405, the CPU 20 executes positional alignment on the three scanned data as illustrated in FIG. 15B. Various techniques are proposed for positional alignment of multiple images. In this example, any of these techniques can be used as long as it can adjust scanned data positions.

In steps S406 to S408, the CPU 20 executes denoising processing on the images subjected to positional alignment in step S405. The scanned data cannot completely overlap with each other even after positional alignment in most cases as illustrated FIG. 15B. Thus, if the read data is output with a size of the area 113 including the entire scanned data as illustrated in FIG. 15B, its width and height generally exceed those of data obtained through one scanning operation.

To overcome this defect, in step S406, the CPU 20 first aligns an area (where noise-free scanned data is output) with an image obtained by scanning the document set in alignment with the reference position of the document positioning plate In this example, the area is aligned with the scanned data 110 in FIG. 15B. A shaded area of FIG. 15B is output.

Figure 15C:
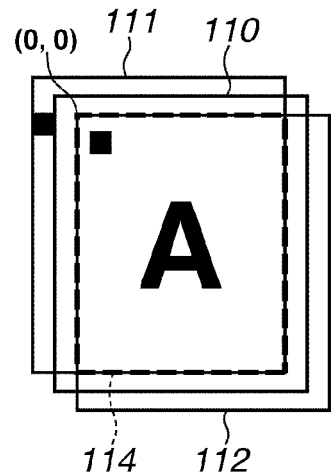
Figure 15D:
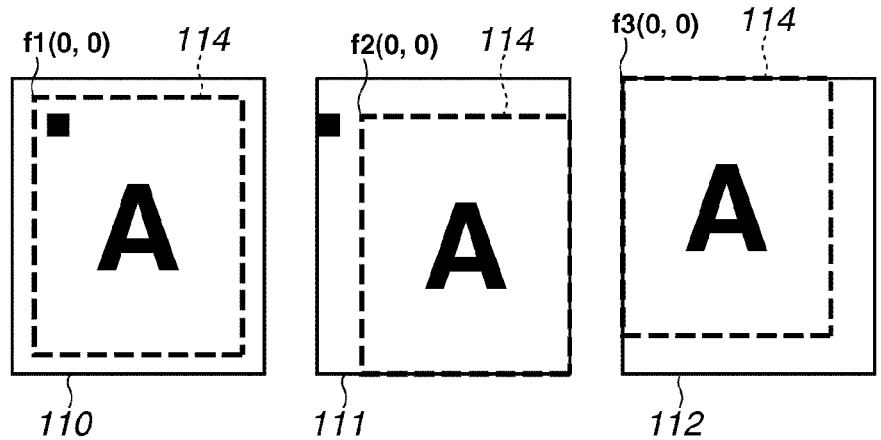

Then, in step S407, the CPU 20 performs the following processing on an area where the three scanned data overlap with one another on a pixel basis to remove noise. The upper left edge of the area 114 where all the scanned data of FIG. 15C overlap one another is set to the origin (0, 0). At this time, the position (0, 0) of the three scanned data is as illustrated in FIG. 15D.

Density values of the three scanned data in the position (m, n) are set as $f1(m, n)$, $f2(m, n)$, and $f3(m, n)$ in S406-2-1. The CPU 20 calculates an intermediate value of $f1(m, n)$, $f2(m, n)$, and $f3(m, n)$ to filter out noise. In step S408, the CPU outputs data based on the intermediate value of the three images obtained in step S407. Here, as for an area where the three scanned data do not overlap one another, the CPU 20 outputs data of the scanned data selected in S406.

In the above flow, the CPU 20 outputs the intermediate value of $f1(m, n)$, $f2(m, n)$, and $f3(m, n)$, but may output an average density value. Further, in the above flow, the CPU 20 in step S408 outputs data of the scanned data determined in step S406.

However, as for an area where two scanned data overlap each other, the CPU 20 may output an average of the two scanned data. In general, if an average density value of scanned data largely varies, an average value is output. If the average value less varies, an intermediate value is output. As a result, higher-quality image data can be obtained.

As described above, according to the second exemplary embodiment, noise resulting from scratches on the document positioning plate can be removed with high accuracy. As a result, higher-quality image data can be obtained. Through the above processing, the CPU 20 can detect the correct position.

Further, the CPU 20 can obtain high-quality scanned data, from which noise resulting from dust, stains, or scratches is removed. Moreover, unlike a denoising method based on smoothing with peripheral pixels, noise can be removed with edge being left. As for physical components added to a conventional image processing apparatus, this exemplary embodiment requires only a memory capable of storing plural read data. The processing itself can be executed based on the program.

Thus, the existing document positioning plate can be used without physically enlarging its area, leading to advantages in terms of size reduction, productivity, and cost. Further, the apparatus can be implemented by a general single image sensor and thus can be reduced in cost and size compared with an apparatus using a plurality of sensors or any dedicated sensor.

Other Exemplary Embodiment

The present invention is applicable to a system including plural devices or an apparatus including a single device.

Further, the present invention can be embodied as follows. TA program for realizing the functions of the above exemplary embodiments is directly or remotely supplied to a system or an apparatus. Then, a computer in the system or the apparatus reads and executes the supplied program code. Accordingly, the program code installed in the computer to realize functions and processing of the present invention is included in the scope of the present invention.

In this case, the program can be supplied in any form, for example, an object code, a program executed by an interpreter, and script data supplied to an operating system (OS), as long as the program has the required functions.

Examples of recording media for supplying the program include a floppy disk, a hard disk, an optical disk (a compact disk (CD) or a digital versatile disk (DVD), a magneto-optical disk, a magnetic tape, a nonvolatile memory card, and a ROM.

Further, the functions of the above exemplary embodiments are realized by the computer executing the read program. In addition, the functions of the above exemplary embodiments are realized such that an OS running on the computer executes a part or all of actual processing according to instructions from the program.

In addition, the functions of the above exemplary embodiments are realized as follows. The program read from a storage medium is written to a memory on a function expansion board inserted to a computer or in a memory incorporated in a function expansion unit connected to the computer. Then, a CPU or the like provided on the function expansion board or incorporated in the function expansion unit executes a part or all of actual processing according to instructions from the read program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-065774 filed Mar. 14, 2007, which is hereby incorporated by reference herein in its entirety.

What is claimed is:

1. An image reading apparatus that reads a document set on a document positioning plate, comprising:
   a detection unit configured to detect, in a predetermined area on the document placing plate, an area where a document is set;
   a first image generation unit configured to read a document set with a first edge of the document aligned with a reference position of the document positioning plate and to generate a first image of an area detected by the detection unit based on the read document;
   a second image generation unit configured to read the document re-set with a second edge different from the first edge of the document aligned with the reference position of the document positioning plate and to generate a second image based on the read document;
   a processing unit configured to perform matching processing to match image data of the first image with and image data of the second image and determine an offset between the first image and the second image according to the matching processing;
   a specification unit configured to specify a size of the document based on the offset determined by the processing unit; and
   a controller configured to, in a case where the area where the document is set exceeds from the predetermined area on the document placing plate when the first image is generated by the first image generating unit, cause the second image generation unit to generate the second image.

2. The image reading apparatus according to claim 1, further comprising a notification unit configured to notify a user of prompt for setting the document with the second edge of the document aligned with the reference position of the document positioning plate after the first image generation unit generates the first image.

3. The image reading apparatus according to claim 2, further comprising:
   a determination unit configured to determine whether a size of the first image is a size of the determined area,
   wherein the notification unit notifies the prompt if the determination unit determines that the size of the first image is the size of the predetermined area.

4. The image reading apparatus according to claim 3, wherein the notification unit does not notify the prompt if the determination unit determines that the size of the first image is smaller than the size of the predetermined area.

5. A method for controlling an image reading apparatus including a reading unit that reads a document set on a document positioning plate, comprising:
   detecting, in a predetermined area on the document positioning plate, an area where the document is set;
   reading, using the reading unit, the document set with a first edge of the document being aligned with a reference position of the document positioning plate and generating a first image of a detected area based on the read document;
   reading, using the reading unit, the document re-set with a second edge different from the first edge of the document being aligned with the reference position of the document positioning plate and generating a second image based on the read document in a case where the area where the document is set exceeds from the predetermined area on the document positioning plate when the first image is generated;
   matching image data of the first image and image data of the second image and determining an offset between the first image and the second image according to the matching; and
   specifying a size of the document based on the determined offset.

6. A storage medium storing a program that causes a computer to execute the method according to claim 5.

* * * * *